(12) United States Patent
Shibuya

(10) Patent No.: US 9,123,920 B2
(45) Date of Patent: Sep. 1, 2015

(54) FUEL CELL SEPARATOR MATERIAL, FUEL CELL SEPARATOR USING SAME, AND FUEL CELL STACK

(75) Inventor: Yoshitaka Shibuya, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 651 days.

(21) Appl. No.: 13/131,499

(22) PCT Filed: Oct. 16, 2009

(86) PCT No.: PCT/JP2009/067882
§ 371 (c)(1),
(2), (4) Date: Jul. 11, 2011

(87) PCT Pub. No.: WO2010/061694
PCT Pub. Date: Jun. 3, 2010

(65) Prior Publication Data
US 2011/0262825 A1   Oct. 27, 2011

(30) Foreign Application Priority Data

Nov. 28, 2008 (JP) ................................. 2008-303606

(51) Int. Cl.
*H01M 2/16* (2006.01)
*H01M 8/24* (2006.01)
(Continued)

(52) U.S. Cl.
CPC .......... *H01M 8/0228* (2013.01); *H01M 8/0206* (2013.01); *H01M 8/0215* (2013.01); *H01M 8/1011* (2013.01); *H01M 2008/1095* (2013.01); *Y02E 60/50* (2013.01); *Y02E 60/523* (2013.01)

(58) Field of Classification Search
CPC .......................... H01M 8/0208; H01M 8/0228
USPC ............................................................ 429/457
See application file for complete search history.

(56) References Cited

U.S. PATENT DOCUMENTS

| 5,942,350 | A | 8/1999 | Roy et al. |
| 6,893,765 | B1 | 5/2005 | Nishida et al. |

(Continued)

FOREIGN PATENT DOCUMENTS

| CA | 2744844 | 8/2013 |
| CN | 101599542 | 12/2009 |

(Continued)

OTHER PUBLICATIONS

Notification of Transmittal of Translation of the International Preliminary Report on Patentability (Chapter I or Chapter II) corresponding to International Patent Application No. PCT/JP2009/067882 dated Jul. 14, 2011.

(Continued)

*Primary Examiner* — Nicholas P D'Aniello
(74) *Attorney, Agent, or Firm* — Jenkins, Wilson, Taylor & Hunt, P.A.

(57) ABSTRACT

A fuel cell separator material, comprising an alloy layer 6 containing Au and a first component containing Al, Cr, Fe, Co, Ni, Cu, Mo, Sn or Bi, or an Au single layer 8 formed on a Ti base 2; an intermediate layer 2a containing Ti, O, the first component, and less than 20 mass % of Au arranged between the alloy layer or the Au single layer and the Ti base; wherein the alloy layer or the Au single layer has a region having a thickness of 1 nm or more from the uppermost to the lower layer and containing 50 mass % or more of Au, or a region having a thickness of 3 nm or more from the uppermost to the lower layer and containing Au in the range from 10-50 mass %, or the thickness of the Au single layer is 1 nm or more.

11 Claims, 8 Drawing Sheets

(51) Int. Cl.
*H01M 8/02* (2006.01)
*H01M 8/10* (2006.01)

(56) References Cited

U.S. PATENT DOCUMENTS

| | | | |
|---|---|---|---|
| 2004/0170881 A1* | 9/2004 | Nakata | 429/34 |
| 2005/0158607 A1* | 7/2005 | Vyas et al. | 429/34 |
| 2006/0134501 A1 | 6/2006 | Lee et al. | |
| 2008/0107928 A1* | 5/2008 | Kikui | 429/12 |
| 2009/0297918 A1 | 12/2009 | Sasaoka et al. | |
| 2012/0009496 A1 | 1/2012 | Shibuya | |
| 2012/0202133 A1 | 8/2012 | Shibuya et al. | |
| 2013/0244129 A1 | 9/2013 | Shibuya et al. | |
| 2014/0295322 A1 | 10/2014 | Shibuya | |

FOREIGN PATENT DOCUMENTS

| | | |
|---|---|---|
| CN | 102227841 | 7/2014 |
| JP | 2001-514705 | 9/2001 |
| JP | 2001-297777 | 10/2001 |
| JP | 2002-367434 | 12/2002 |
| JP | 2004-185998 | 7/2004 |
| JP | 2004-296381 | 10/2004 |
| JP | 2005-243401 | 9/2005 |
| JP | 2007-059375 | 3/2007 |
| JP | 2008-153082 | 7/2008 |
| JP | 2008-210773 | 9/2008 |
| JP | 2009-295343 | 12/2009 |
| JP | 2010-238577 | 10/2010 |
| JP | 2011-76847 | 4/2011 |
| JP | 5313264 | 10/2013 |
| KR | 101301831 | 8/2013 |
| WO | WO01/22513 | 3/2001 |
| WO | WO2006/028184 | 3/2006 |
| WO | WO2006/082734 | 8/2006 |
| WO | WO2010/061694 | 6/2010 |
| WO | WO2010/071068 | 6/2010 |
| WO | WO 2013/021465 | 2/2013 |

OTHER PUBLICATIONS

International Search Report corresponding to International PCT/JP2009/067882 dated Jan. 19, 2010.
Advisory Action corresponding to U.S. Appl. No. 13/139,237 dated Jul. 1, 2014.
International Search Report corresponding to International Patent Application No. PCT/JP2009/070648 dated Mar. 23, 2010.
Notification of Transmittal of Translation of the International Preliminary Report on Patentability (Chapter I or Chapter II) corresponding to International Patent Application No. PCT/JP2009/070648 dated Jul. 14, 2011.
Official Action corresponding to U.S. Appl. No. 13/139,237 dated Jul. 18, 2013.
Official Action corresponding to U.S. Appl. No. 13/139,237 dated Mar. 12, 2014.
International Search Report corresponding to International Patent Application No. PCT/JP2011/068166 dated Oct. 18, 2011.
Notification of Transmittal of Translation of the International Preliminary Report on Patentability (Chapter I or Chapter II) corresponding to International Patent Application No. PCT/JP2011/068166 dated Feb. 20, 2014.
Official Action corresponding to U.S. Appl. No. 13/139,237 dated Nov. 26, 2014.
Interview Summary corresponding to U.S. Appl. No. 13/139,237 dated Mar. 26, 2015.
Official Action corresponding to U.S. Appl. No. 13/139,237 dated Jun. 4, 2015.

* cited by examiner

FUEL CELL SEPARATOR MATERIAL, FUEL CELL SEPARATOR USING SAME, AND FUEL CELL STACK

FIELD OF THE INVENTION

The present invention relates to a fuel cell separator material on which Au or an Au alloy (a layer containing Au) is formed, a fuel cell separator using the same and a fuel cell stack.

DESCRIPTION OF THE RELATED ART

Traditionally, as a polymer electrolyte fuel cell separator, a carbon plate on which gas flow paths are formed has been used. However, it is undesirable in that material costs and processing costs are high. On the other hand, when a metal plate is used in place of the carbon plate, it might undesirably be corroded and eluted at high temperature under oxidizing atmosphere. To avoid this, there is a known technology that an alloy of Au and a noble metal selected from Au, Ru, Rh, Pd, Os, Ir, Pt or the like is sputtered on a Ti plate to form an electrical conductive portion (see Patent Literature 1). In addition, Patent Literature 1 describes that the oxide of the aforementioned noble metal is formed on a Ti surface.

Meanwhile, it is known that a fuel cell separator is produced by forming an Au layer on an oxide layer of a Ti base via an intermediate layer comprising Ti, Zr, Hf, V, Nb, Ta, Cr, Mo, W or the like (see Patent Literature 2). The intermediate layer is said to have good adhesion property with a base oxide layer, i.e., good binding property with O (oxygen atoms) and have good adhesion and binding properties with an Au layer, since the intermediate layer is metal or half-metal.

As the polymer electrolyte fuel cell, a direct methanol fuel cell (DMFC) using methanol, which is easily handled, as a fuel gas to be fed to an anode has also been developed. Since the DMFC can take energy (electricity) directly from methanol, no reformer is needed, and a small-sized fuel cell can be produced, the DMFC is also expected as a power supply of mobile devices.

Two structures of the DMFC are proposed: A first structure is a layered type (active type) structure that single cells (membrane electrode assemblies (herein referred to as MEAs) each of which is composed of a polymer electrolyte membrane sandwiched between a fuel electrode and an oxygen electrode) are layered. A second structure is a flat type (passive type) structure that a plurality of single cells are disposed in a planar direction. In these structures, a plurality of single cells are connected in series (herein referred to as a stack). Since the passive type structure requires no active fuel transport means for providing a fuel gas (fuel liquid) or air to the cell, the smaller-sized fuel cell may be expected (see Patent Literature 3).

The fuel cell separator has electrical conductivity, connects each single cell electrically, collects energy (electricity) produced on each single cell, and has flow paths for fuel gas (fuel liquid) or air (oxygen) that are provided to each single cell. The separator is also referred to as an interconnector, a bipolar plate or a current collector.

There are many conditions required for the current collector of the DMFC as compared with those required for the polymer electrolyte fuel cell separator using hydrogen gas. Specifically, in addition to the corrosion resistance against a sulfuric acid solution required for the normal polymer electrolyte fuel cell, the corrosion resistance against a methanol fuel solution and a formic acid solution is required. The formic acid is a by-product produced when hydrogen ions are produced from methanol on an anode catalyst.

As described above, the materials that are used for the conventional polymer electrolyte fuel cell separater are not always applicable to the DMFC under the DMFC operable conditions.

[Patent Literature 1] Unexamined Japanese Patent Publication (Kokai) 2001-297777
[Patent Literature 2] Unexamined Japanese Patent Publication (Kokai) 2004-185998
[Patent Literature 3] Unexamined Japanese Patent Publication (Kokai) 2005-243401

PROBLEMS TO BE SOLVED BY THE INVENTION

In the technology described in Patent Literature 1 mentioned above, to provide the Au alloy layer having good adhesion, the oxide layer on the surface of the titanium base is required to be removed. If the oxide layer is removed insufficiently, the adhesion of the noble metal layer is decreased.

Patent Literature 2 describes the formation of the electrically conductive thin layer on the surface of the oxide layer above the surface of the base. If Au, for example, is formed while leaving the oxide layer on the surface of the titanium base, the Au layer is formed uneven. In particular, in the wet gold plating, the shape of the electrodeposited plating is granular. When the oxide layer remains on the surface of the titanium base, there may be a non-plated portion on a part of the surface of the titanium base. Although Patent Literature 2 describes that the intermediate layer is provided to improve the adhesion property, the intermediate layer itself cannot provide the sufficient adhesion property, the corrosion resistance and the durability required for the fuel cell separator.

The technology described in Patent Literature 3 is that resin is coated on the base obtained by cladding stainless on both surface of a copper plate, which may not have good corrosion resistance.

Accordingly, the present invention is made to solve the problems described above. The object of the present invention is to provide a fuel cell separator material; a fuel cell separator using the same; and a fuel cell stack that can form, on a surface of a titanium base, an electrically conductive layer containing Au having high corrosion resistance, high adhesion property, and high durability under the operating conditions of a fuel cell.

SUMMARY OF THE INVENTION

Through diligent studies, the present inventors found that an intermediate layer containing Ti and O and the predetermined metal is formed on a surface of a Ti base, and an alloy layer or an Au single layer is formed on the intermediate layer, whereby an Au (alloy) layer can be formed on Ti strongly and uniformly, and corrosion resistance and durability required for a fuel cell separator can be obtained.

To achieve the above object, the present invention provides a fuel cell separator material, comprising an alloy layer containing Au and a first component containing at least one metal selected from a group consisting of Al, Cr, Fe, Co, Ni, Cu, Mo, Sn and Bi or an Au single layer formed on a Ti base; an intermediate layer containing Ti, O, the first component, and less than 20 mass % of Au arranged between the alloy layer or the Au single layer and the Ti base; wherein the alloy layer or the Au single layer has a region having a thickness of 1 nm or more from the uppermost surface toward the lower layer and containing 50 mass % or more of Au, or a region having a thickness of 3 nm or more from the uppermost surface toward the lower layer and containing Au in the range from 10 mass % or more to less than 50 mass %, or the thickness of the Au single layer is 1 nm or more.

Preferably, the intermediate layer exists as a layer having a thickness of 1 nm or more containing 10 mass % or more of Ti and O, respectively, and 20 mass % or more of the first component.

Preferably, a metal layer comprising the first component having a thickness of 5 nm or less is formed or is not formed between the alloy layer and the intermediate layer. The corrosion resistance improves when the thickness of the metal layer becomes thin.

Preferably, the concentration of the Au in the alloy layer is increased from the bottom layer to the upper layer. When an Au single layer is formed on the surface of the alloy layer, good corrosion resistance, electrical conductivity and durability is shown even the separator is used under the conditions of a fuel cell.

Preferably, the Ti base is formed by coating a Ti coating with a thickness of 10 nm or more on a material other than Ti.

The fuel cell separator material of the present invention is preferably use in a polymer electrolyte fuel cell or a direct methanol polymer electrolyte fuel cell.

A fuel cell separator of the present invention uses said fuel cell separator material, wherein a reaction gas flow path and/or a reaction liquid flow path is press-formed on the Ti base, and then the alloy layer or the Au single layer is formed.

A fuel cell separator of the present invention uses said fuel cell separator material, wherein the alloy layer or the Au single layer is formed on the Ti base, and then a reaction gas flow path and/or a reaction liquid flow path is press-formed.

A fuel cell stack of the present invention comprises the fuel cell separator material or the fuel cell separator.

According to the present invention, since an intermediate layer containing Ti, O, and the predetermined metal is formed on the surface of the Ti base, and the alloy layer or the Au single layer is formed on the intermediate layer, the Au layer or the layer containing Au can be formed strongly and uniformly on Ti, and corrosion resistance, electrical conductivity and durability required for a fuel cell separator can be obtained.

DESCRIPTION OF THE PREFERRED EMBODIMENTS

Embodiments of the fuel cell separator material according to the present invention will be described below. The symbol "%" herein refers to % by mass, unless otherwise specified.

The term "fuel cell separator" herein refers to a fuel cell separator which has electrical conductivity, connects each single cell electrically, collects energy (electricity) produced on each single cell, and has flow paths for fuel gas (fuel liquid) or air (oxygen) that is provided to each single cell. The separator is also referred to as an interconnector, a bipolar plate or a current collector.

Accordingly, the fuel cell separator includes a separator having concave-convex flow paths formed on a surface of a plate-like base, as well as a separator having flow paths with open holes for a gas or methanol formed on a surface of a plate-like base, such as the above-mentioned passive type DMFC separator, which will be described below for detail.

<First Embodiment>

Figure 1:
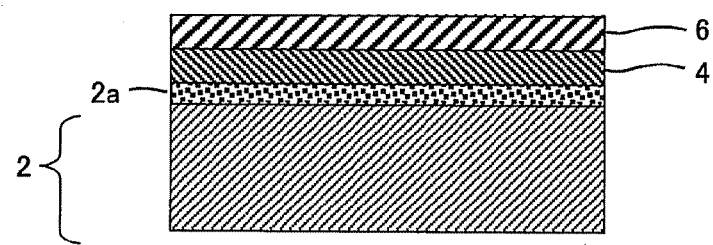
FIG. 1 shows a structure of a fuel cell separator material according to the first embodiment of the present invention.

The fuel cell separator material according to a first embodiment of the present invention will be described below. As shown in FIG. 1, the fuel cell separator material according to the first embodiment comprises a metal layer 4 formed on a surface of a Ti base 2 via an intermediate layer 2a, and an alloy layer 6 formed on a surface of the metal layer 4. The metal layer 4 mainly comprises the above-mentioned metal (preferably the same as the first component of the intermediate layer).

<Ti Base>

The fuel cell separator material requires corrosion resistance and electrical conductivity, and the base requires corrosion resistance. So, a titanium material having good corrosion resistance is used as the base.

The Ti base may be solid titanium, or may be a material other than Ti having a Ti coating thereon with a thickness of 10 nm or more. Examples of the material other than Ti include stainless steel and aluminum. When Ti is coated on the surface of the material, lower corrosion resistance of stainless steel or aluminum as compared with titanium can be improved. Corrosion resistance can be improved, only if Ti is coated with a thickness of 10 nm or more.

There is no special limitation about the material of the Ti base 2, as long as titanium is used. Also, there is no special limitation about the shape of the Ti base 2, as long as the first component and gold can be sputtered. In terms of press-molding it to a separator shape, it is preferable that the Ti base is in a plate-like shape and the Ti base has a total thickness of 10 μm or more.

O (oxygen) contained in the intermediate layer 2a is naturally produced, when the Ti base 2 is left in the air. Also, O may be produced positively under oxidizing atmosphere.

<Alloy Layer>

An alloy layer 6 containing Au and a first component comprising at least one metal selected from a group consisting of Al, Cr, Fe, Co, Ni, Cu, Mo, Sn and Bi is formed on the Ti base 2. The alloy layer is for adding the Ti base with the properties belonging to Au such as corrosion resistance and conductivity, and hydrogen brittleness resistance.

The above-mentioned metals selected as the first component have properties including a) easy binding to oxygen, b) alloy formation with Au, and c) less absorption of hydrogen, provide the alloy layer with the above-mentioned functions, and form the intermediate layer to improve the adhesion between the alloy layer and the Ti base.

The above-mentioned metals are more oxidizable than Au based on the potential-pH diagram, and absorb less hydrogen. Utilizing such properties, the first component is used as a constituent element of the intermediate layer. The first component may be composed of a single element or plural elements. In view of corrosion resistance, conductivity and durability, Cr and Mo are preferable as the first component.

The alloy layer can be identified by a STEM analysis as described later. According to the STEM analysis, the alloy layer is a region having a thickness of 1 nm or more and containing 50 mass % or more of Au from the uppermost surface toward the lower layer, and disposed above the intermediate layer. The alloy layer preferably has a thickness of 1 to 100 nm. If the alloy layer has a thickness of less than 1 nm, the corrosion resistance required for the fuel cell separator may not be provided to the Ti base. The alloy layer has more preferably a thickness of 2 nm or more, still preferably 4 nm or more.

In addition, the first component and Au may be heat treated after the layer formation. When the heat treatment is conducted, oxidation and diffusion may proceed to decrease the concentration of Au on the surface layer to less than 50% by mass. However, when the region having a thickness of 3 nm or more from the uppermost surface toward the lower layer and containing Au in the range from 10% by mass or more to less than 50% by mass exists, titanium does not diffuse on the surface layer, and the alloy layer fulfills the function.

Figure 11:
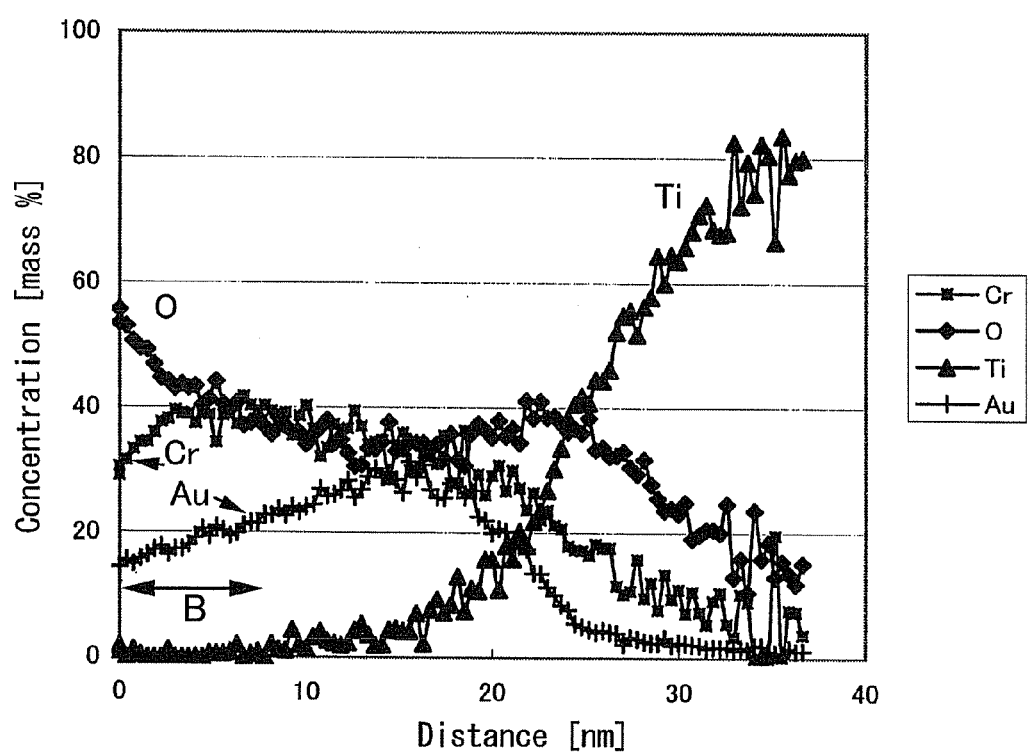
FIG. 11 shows an XPS analysis of a section of the fuel cell separator material after the heat treatment.

FIG. 11 shows an XPS (X-ray photoelectron spectroscopy) profile of a section of a layer structure obtained by heating at 160° C. for 24.6 hours after the layers of Cr having a thickness of 2 nm and Au having a thickness of 2 nm were formed on the Ti base. The condition of 160° C. for 24.6 hours is assumed that the fuel cell is used for 400 thousands hours (about 40 years). As shown in FIG. 11, the region (symbol B in FIG. 11) containing 10 mass % or more and less than 50% by mass of Au is formed at a thickness of 3 nm or more.

FIG. 11 is a depth profile of the XPS analysis. The concentrations of Au, Ti, O and Cr were analyzed to determine the layer structure of the surface layer. As the XPS apparatus, 5600MC manufactured by ULVAC-PHI, Inc., was used at ultimate vacuum of $6.5 \times 10^{-8}$ Pa, excitation source of monochromatic AIK, output of 300 W, detected area of 800 μm diameter, incident angle of 45 degree, take-off angle of 45 degree without a electron flood gun under the following sputtering conditions:

Ion species: Ar+
Acceleration voltage: 3 kV
Sweep area: 3 mm×3 mm
Rate: 2.0 nm/min ($SiO_2$ conversion)

The concentration (% by mass) of each element was analyzed using the XPS based on the total 100% by mass of the designated element. The term "1 nm distance" in the thickness direction in the XPS analysis refers to the abscissa axis distance (distance by $SiO_2$ conversion) of the chart of the XPS analysis.

When the fuel cell is operated, the separator material is heated at similar temperature near the cell temperature (in the case of the PEFC: 80 to 90° C.). If the separator material is exposed to the heat for a long period of time, the metal of the separator material may be diffused and the cell properties (contact resistance, corrosion resistance and the like) may be deteriorated. Therefore, the separator material structure and the cell properties must be evaluated by an aging test to simulate the long term operation of the fuel cell. The fuel cell will last up to 90,000 hours for household use, and 5,000 hours for automobile use. The thermal load (heated under atmosphere) of the operation time of 400,000 hours (at cell temperature of 90° C.) that is significantly longer than the 90,000 hours for household use is calculated by the relation between the diffusion coefficient D, the diffused layer δ and the time t ($\delta=(Dt)^{0.5}$). The resultant condition for the aging test is to be 160° C. for 24.6 hours.

If the alloy layer has a thickness of more than 100 nm, Au is consumed and the costs may be increased. If the concentration of Au is less than 50% by mass in the region having a thickness of 1 nm or more from the uppermost surface toward the lower layer, or if the concentration of Au is less than 10% by mass in the region having a thickness of 3 nm or more from the uppermost surface toward the lower layer, corrosion resistance required for the fuel cell separator cannot be provided.

Also, the Au single layer may be formed in place of the alloy layer 6. The Au single layer includes almost 100% wt of Au according to the STEM analysis, and should have a thickness of 1 nm or more.

In addition, the composition domain (noble metal region) mainly comprising the first component may be formed in the side of the alloy layer 6 that faces the intermediate layer.

<Intermediate Layer>

An intermediate layer 2a comprising Ti, O and the first component and less than 20% by mass of Au is provided between the alloy layer (or the Au single layer) 6 and the Ti base 2.

Generally, the Ti base has an oxide layer thereon, and the Au (containing) layer which is less oxidized is therefore difficult to be formed directly on the Ti surface. On the other hand, the above-mentioned metals are more easily oxidized than Au, and form an oxide with O atoms in Ti oxide on the Ti base, which is considered to be bond strongly to the surface of the Ti base.

In addition, the above-mentioned metals absorb less hydrogen. In light of these points, when the conductive layer containing Au (the above-mentioned alloy layer or the Au single layer) has a thickness of 10 nm or less, the intermediate layer is formed by Ti, O and the first component, resulting in the more durable separator material compared with the conventional intermediate layer made simply by Ti, Zr, Hf, V, Nb, Ta, Cr, Mo, W and the like.

Preferably, the intermediate layer contains no Au. If the intermediate layer contains 20% by mass or more of Au, the adhesion property is decreased. In order to provide the intermediate layer containing less than 20% by mass of Au, a target of single first component or a target of the first component containing low concentration of Au and Au alloy is preferably used to sputter on the Ti base.

Preferably, the intermediate layer exists as a layer having a thickness of 1 nm or more containing 10 mass % or more of Ti and O, respectively, and 20 mass % or more of the first component. In this case, when the section of the fuel cell separator material is analyzed with the STEM (scanning transmission electron microscope), there exists the region having a thickness of 1 nm or more and containing 10% by mass or more of Ti and O respectively, 20% by mass or more of the first component and 20% by mass or more of Au in the thickness direction. The thickness of the intermediate layer containing such composition is not limited, but having a thickness of 100 nm or less is preferably in terms of the costs of the first component.

The STEM analysis is to use EDS (Energy Dispersive X-ray Spectrometer) attached to the STEM apparatus, specify the part (line) and the elements to be analyzed, and detect the concentration of the elements specified in the part.

The elements to be specified are Au, the first component, O, Ti and, if used, second components as described later.

The lower limit of Ti and O is set to 10% by mass and the lower limit of the first component is set to 20% by mass, because the region containing less than 20% by mass of the first component is near the surface of the Ti base, the region containing less than 10% by mass of Ti is near the alloy layer, and in the region containing less than 10% by mass of O, the first component and Ti do not form oxides with O atoms such that it does not function as the intermediate layer. In addition, since the concentration of each of Ti and O is decreased sharply under 10% by mass, the lower limit is set to 10% by mass in terms of the measurement limitations. The concentration of Au is set to less than 20% by mass, because the adhesion property is improved.

The distance 1 nm in the thickness direction refers to the real distance of the scanning distance in the STEM analysis.

<Metal Layer>

The metal layer 4 is a single layer composed of the first component(s). The intermediate layer is formed by diffusing a part of the first component to the titanium oxide layer, and the Au alloy layer is formed by diffusing a part of the first component to the surface and alloyed with Au. The first component that is not diffused and remains as a layer forms the metal layer 4. Accordingly, the metal layer 4 can be formed appropriately by changing the sputter conditions (sputter time, output and the like).

However, the metal layer 4 tends to decrease corrosion resistance and durability. Preferably, the metal layer 4 has a thickness of 5 nm or less, more preferably 3 nm or less.

The metal in the metal layer 4 and the first component in the alloy layer 6 may be the same or different element, but the use of the same element makes the manufacture easier.

The metal layer 4 can be identified by the STEM analysis as described later. Based on the STEM analysis, the thickness of the metal layer 4 is defined when the total concentration of the first component is 70% by mass or more.

According to the present invention, the concentration of O in the region of the alloy layer 6 having the Au concentration of 10% is preferably 30% by mass or less.

The depth region of the alloy layer 6 having the Au concentration of 10% shows a boundary between the intermediate layer 2a and the alloy layer 6. If the region includes a high concentration of O, the alloy layer 6 may have decreased corrosion resistance and adhesion between the intermediate layer 2 and the alloy layer 6 may be decreased.

Preferably, the alloy layer has the gradient composition where the concentration of Au is increased from the bottom layer to the upper layer. The concentration (% by mass) of Au can be determined by the STEM analysis as described above. The thickness of the alloy layer or the Au single layer is the real distance of the scanning distance in the STEM analysis.

When the alloy layer has the gradient composition, the concentration of the first component that is easily oxidized than Au is increased in the bottom layer of the alloy layer, which is strongly bonded to the surface of the Ti base, and the properties of Au strongly affects on the upper layer of the alloy layer to improve corrosion resistance and durability.

<Production of the Fuel Cell Separator Material>

The intermediate layer in the fuel cell separator material can be formed by sputtering the first component as the target to the base without removing the surface Ti oxide layer on the Ti base, to bind the first component to O in the surface Ti oxide layer. Alternatively, the intermediate layer can also be formed by sputtering the oxide of the first component(s) as the target after the surface Ti oxide layer of the Ti base 2 is removed, or by sputtering the first component as the target under oxidation atmosphere after the surface Ti oxide layer of the Ti base 2 is removed.

Upon sputtering, the surface Ti oxide layer on the Ti base may be properly removed and reverse sputtering (ion etching) may be conducted in order to clean the surface of the base. The reverse sputtering can be conducted by, for example, irradiating the base with argon gas at an argon pressure of about 0.2 Pa at RF output of about 100 W.

Au atoms may be incorporated into the intermediate layer by sputtering Au to form the alloy layer as described below. Alternatively, the alloy target containing the first component and Au may be sputtered to the surface of the Ti base.

The alloy layer can be formed by sputtering the first component on the Ti base as described above, and then sputtering Au on the layer of the first component. In this case, the sputter particles have high energy. Even if only the layer of the first component is formed on the surface of the Ti base, sputtered Au can enter into the layer of the first component to provide the alloy layer. Also, in this case, the alloy layer has the gradient composition where the concentration of Au is increased from the bottom layer to the upper layer.

Alternatively, first, the alloy target containing the first component and Au at low concentration may be sputtered to the surface of the Ti base, and then the alloy target containing the first component and Au at high concentration may be sputtered thereto.

<Second Embodiment>

Figure 2:
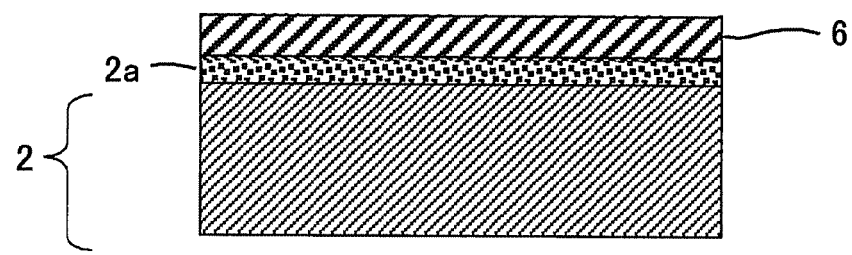
FIG. 2 shows a structure of a fuel cell separator material according to the second embodiment of the present invention.

The fuel cell separator material according to a second embodiment of the present invention will be described below. As shown in FIG. 2, the fuel cell separator material according to the second embodiment comprises an intermediate layer 2a formed on a surface of a Ti base 2, and an alloy layer 6 formed on the intermediate layer 2a.

Since the Ti base 2 and the alloy layer 6 are the same as the first embodiment, a description is omitted. The fuel cell separator material according to the second embodiment is different from the first embodiment in that no metal layer 4 is formed, and has excellent corrosion resistance as compared with the first embodiment.

Also in the second embodiment, the concentration of O in the depth region of the alloy layer 6 having the Au concentration of 10% is preferably 30% by mass or less. The depth region of the alloy layer 6 having the Au concentration of 10% is a boundary between the intermediate layer 2a and the alloy layer 6. If the region includes a high concentration of O, the alloy layer 6 may have decreased corrosion resistance and adhesion between the intermediate layer 2 and the alloy layer 6 may be decreased.

Also in the second embodiment, as in the first embodiment, the alloy layer preferably has a thickness of 1 to 100 nm.

Figure 3:
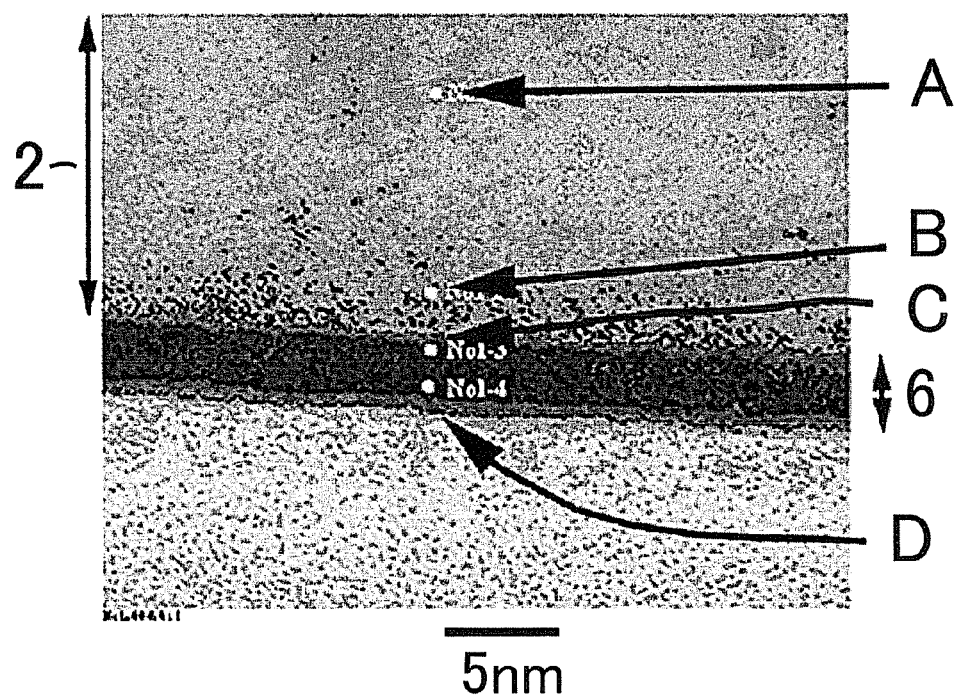
FIG. 3 shows a FE-TEM image of a section of the fuel cell separator material according to the second embodiment of the present invention.

FIG. 3 shows an actual image of a section of the fuel cell separator material according to the second embodiment obtained by FE-TEM (field-emission transmission electron microscopy).

It shows that the alloy layer 6 comprising Cr and Au forms an uniform layer (black line image). Based on EDX (energy-dispersive X-ray spectroscopy), the composition of the alloy layer 6 in the C position (white spot) was Cr: 43% by mass and Au: 57% by mass, and the composition in the D position was Cr: 32% by mass and Au: 68% by mass. In other words, the concentration of the Au in the alloy layer was increased from the bottom layer to the upper layer. The composition in the A position was Ti, and in the B position was Ti oxide layer (Ti and O were detected by EDX) on the Ti base, although EDX cannot determine whether or not the oxide layer contains the first component (Cr).

<Third Embodiment>

Figure 5:
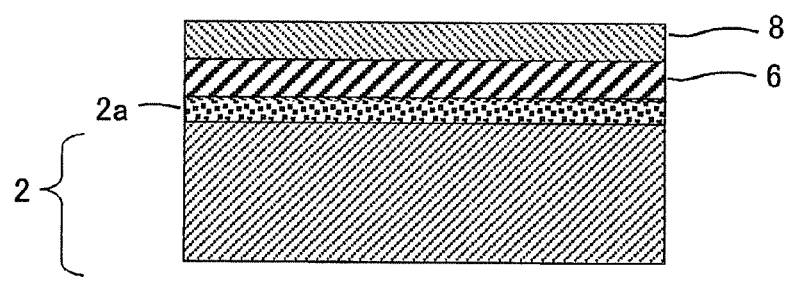
FIG. 5 shows a structure of a fuel cell separator material according to the third embodiment of the present invention.

The fuel cell separator material according to a third embodiment of the present invention will be described below. As shown in FIG. 5, the fuel cell separator material according to the third embodiment comprises an alloy layer 6 formed on a surface of a Ti base 2 via an intermediate layer 2$a$, and an Au single layer 8 is formed on the surface of the alloy layer 6. Since the Ti base 2 and the alloy layer 6 are the same as the first embodiment, a description is omitted.

The Au single layer 8 can be formed appropriately by changing the sputter conditions (sputter time, output and the like).

Alternatively, the layer structures of the first and third embodiments may be combined to form a layer structure having the metal layer 4, the alloy layer 6 and the Au single layer 8 in order via the intermediate layer 2$a$ on the surface of the Ti base 2.

According to the fuel cell separator material embodiments of the present invention, the Au (alloy) layer can be formed on the Ti strongly and uniformly and this layer has conductivity, corrosion resistance and durability, which is suitable to a fuel cell separator material. In addition, according to the embodiments of the present invention, the Au (alloy) layer is sputtered to be uniform, which is smoother than that formed by gold wet plating, so Au is advantageously saved.

<Fuel Cell Separator>

Then, the fuel cell separator made with the fuel cell separator material according to the present invention will be described below. The fuel cell separator is made by working the above-mentioned fuel cell separator material into the predetermined shape, and comprises reaction gas flow paths or reaction liquid flow paths (channels or openings) for flowing a fuel gas (hydrogen), a fuel liquid (methanol), air (oxygen), cooling water and the like.

<Layered Type (Active Type) Fuel Cell Separator>

Figure 6:
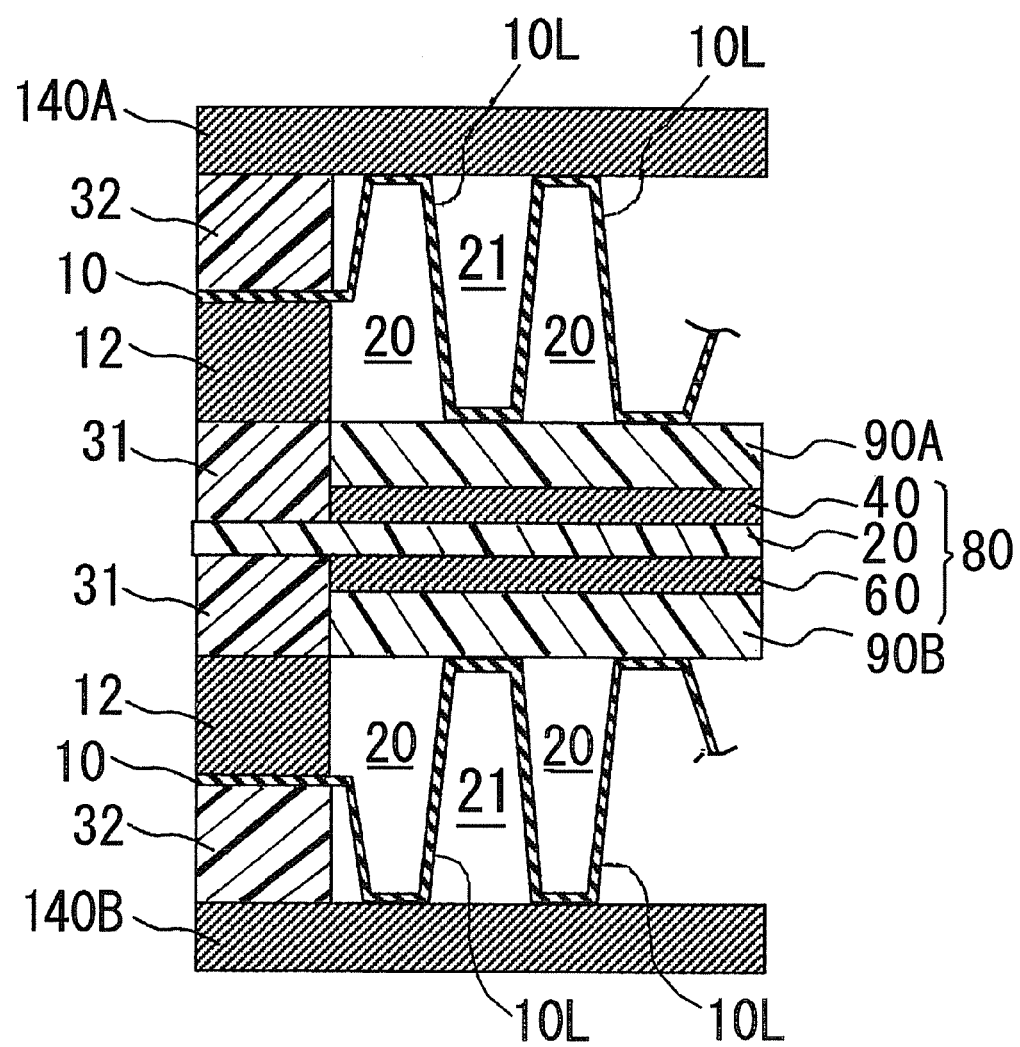
FIG. 6 is a section view of a fuel cell stack (single cell) according to the embodiment of the present invention.

FIG. 6 shows a section of a single cell of the layered type (active type) fuel cell. In FIG. 6, current collector plates 140A and 140B are disposed outside of a separator 10, as described later. Generally, when the single cells are layered to form a stack, only a pair of the current collector plates is disposed on both ends of the stack.

The separator 10 has electrical conductivity, contacts with MEA as described later to collect current, and electrically connects respective single cells. In addition, as described later, the separator 10 has channels as flow paths for flowing a fuel gas or air (oxygen).

In FIG. 6, MEA (Membrane Electrode Assembly) 80 is made by laminating an anode electrode 40 and a cathode electrode 60 on both sides of a polymer electrolyte membrane 20. On the surfaces of the anode electrode 40 and the cathode electrode 60, an anode side gas diffusion layer 90A and a cathode side gas diffusion layer 90B are laminated, respectively. The MEA herein may be a laminate including the gas diffusion layers 90A and 90B. When the gas diffusion layers are formed on the surfaces of the anode electrode 40 and the cathode electrode 60, the laminate of the polymer electrolyte membrane 20, the anode electrode 40 and the cathode electrode 60 may be referred to as the MEA.

On both sides of the MEA 80, separators 10 are disposed facing to the gas diffusion layers 90A and 90$b$, and sandwich the MEA 80. Flow paths 10L are formed on the surfaces of the separators 10 at the side of the MEA 80, and gas can be enter and exit into/from an internal spaces 20 surrounded by gaskets 12, the flow paths 10L and the gas diffusion layer 90A (or 90B) as described later.

A fuel gas (hydrogen or the like) flows into the internal spaces 20 at the anode electrode 40, and an oxidizing gas (oxygen, air or the like) flows into the internal spaces 20 at the cathode electrode 60 to undergo electrochemical reaction.

The outside peripherals of the anode electrode 40 and the gas diffusion layer 90A are surrounded by a frame-like seal member 31 having the almost same thickness as the total thickness of the anode electrode 40 and the gas diffusion layer 90A. A substantially frame-like gasket 12 is inserted between the seal member 31 and the peripheral of the separator 10 such that the separator is contacted with the gasket 12 and the flow paths 10L are surrounded by the gasket 12. The current collector plate 140A (or 140B) is laminated on the outer surface (opposite surface of the MEA 80 side) of, the separator 10 such that the separator 10 is contacted with the collector plate 140A (or 140B), and a substantially frame-like seal member 32 is inserted between the current collector plate 140A (or 140B) and the peripheral of the separator 10.

The seal member 31 and the gasket 12 form a seal to prevent the fuel gas or the oxidizing gas from leaking outside the cell. When a plurality of the single cells are laminated to form a stack, a gas flows into a space 21 between the outside of the separator 10 and the current collector plate 140A (or 140B); the gas being different from that flowing into the space 20 (When the oxidizing gas flows into the space 20, hydrogen flows into the space 21). Therefore, the seal member 32 is also used as the member for preventing the gas from leaking outside the cell.

The fuel cell includes the MEA 80 (and the gas diffusion layers 90A and 90B), the separator 10, the gasket 12 and the current collectors 140A and 140B. A plurality of the fuel cells are laminated to form a fuel cell stack.

Then, the structure of the separator 10 will be described referring to FIG. 7. The separator 10 is press-formed in a rectangular shape from the fuel cell separator material of the present invention. At the left upper edge (upper side) of the separator 10, a fuel gas inlet hole 10$x$ is provided. At the right lower edge (lower side) of the separator 10, a fuel gas outlet hole 10$y$ is provided.

Figure 7:
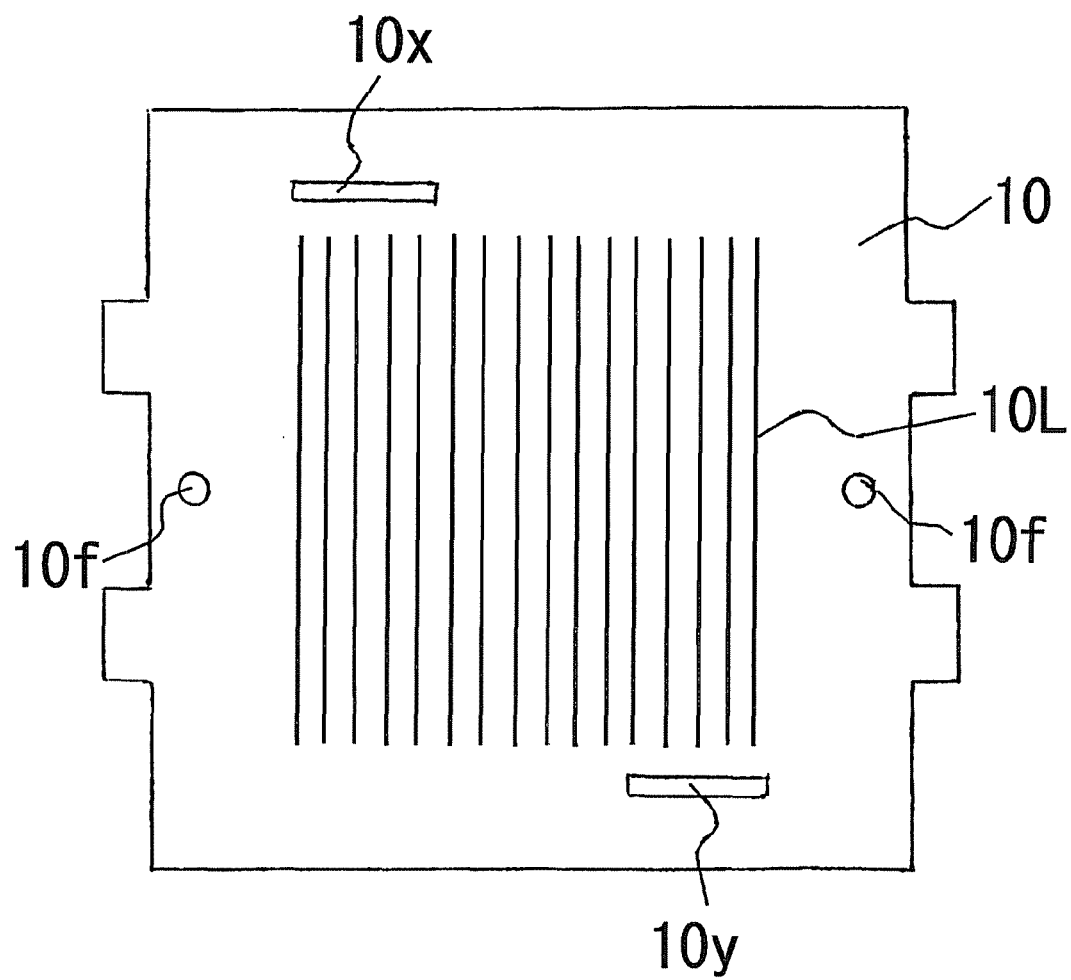
FIG. 7 is a plan view showing the structure of the separator according to the embodiment of the present invention.

In addition, a plurality of straight flow path channels 10L are press-formed to extend parallel in a direction from the upper side to the lower side of the separator 10 (from a top to a bottom direction in FIG. 7). The straight flow path channels 10L produce parallel gas flows.

According to the embodiment, beginning and ending of the straight flow path channels 10L do not reach the outer edges of the separator 10. The peripheral of the separator 10 has a flat part where no straight flow path channels 10L are formed. According to the embodiment, although the straight flow path channels 10 abutted are disposed at even intervals, they may be disposed at uneven intervals.

In addition, positioning holes 10$f$ are opened at opposing side edges (right and left sides) of the separator 10.

The flow path channels may be straight or curve, e.g. elbow, S-curve, and may not always be parallel to each other. In terms of easy formation of the flow path channels, they are preferably parallel straight.

The separator 10 has a thickness of preferably 10 μm or more in terms of the press formability and less than 200 μm in terms of the costs.

Then, the structure of the gasket 12 will be described referring to a plan view of FIG. 8.

The gasket 12 is a sheet, for example, made with TEFLON™, and has a shape of a rectangular frame where an outer edge has almost the same size of that of the separator 10. Its inner edge has an almost rectangular shape surrounding the fuel gas inlet hole 10$x$, the outlet hole 10$y$ and the straight flow path channels 10L. The fuel gas inlet hole 10$x$, the outlet hole 10y and the straight flow path channels 10L are communicated within the internal space of the gasket 12.

Positioning holes 12f are opened at opposing side edges (right and left sides) of the gasket 12. The gasket 12 is laminated to the separator 10 so that the positioning holes 10f and the gasket 12 are overlapped to establish the relative position.

Examples of the material of the gasket 12 include TEFLON™ having corrosion resistance and heat resistance at 80 to 90° C. that is an operating temperature of the fuel cell, a metal plate on which a layer of noble metal is formed having corrosion resistance and heat resistance (a sheet of titanium, stainless steel, aluminum or the like) or a carbon material. The thickness of the gasket 12 depends on the irregularity of the separator 10, but should have the channel height (the height difference between the frame and the irregularity) in the separators or more. For example, when the separator has the channel height of 0.5 mm, the gasket has the thickness of 0.5 mm.

Then, the shape of the gasket 12 will be described in detail. The upper inner edge 12c of the gasket 12 is disposed at little above of the upper end 10L1 of the straight flow path channels, and has a space for turning around and changing the direction by 180 degree of the gas flowing along the straight flow path channels 10L. The left end of the upper inner edge 12c extends to outside so that the fuel gas inlet hole 10x of the separator 10 is exposed to the gasket 12.

Similarly, the lower inner edge 12d of the gasket 12 is disposed at somewhat below of the lower end L2 of the straight flow path channels, and has a space for turning around and changing the direction by 180 degree of the gas flowing along the straight flow path channels 10L. The right end of the lower inner edge 12d extends to outside so that the fuel gas outlet hole 10y of the separator 10 is exposed to the gasket 12.

A piece of a dividing member 12e1 of the upper inner edge 12c extends to inside at a position adjacent to the fuel gas inlet hole 10x. A piece of another dividing member 12e2 of the upper inner edge 12c extends to inside disposed right at a predetermined distance from the dividing member 12e1. The ends of the dividing members 12e1 and 12e2 are contacted with the upper end (corresponds to beginning or terminal end) 10L1 of the straight flow path channels.

Similarly, a piece of a dividing member 12e3 of the lower inner edge 12d extends to inside disposed right at a predetermined distance from the opposed position of the dividing member 12e1. A piece of another dividing member 12e4 of the lower inner edge 12d extends to inside at a position adjacent to the fuel gas outlet hole by and disposed right at a predetermined distance from the opposed position of the dividing member 12e2. The ends of the dividing members 12e3 and 12e4 are contacted with the lower end (corresponds to beginning or terminal end) 10L2 of the straight flow path channels.

Figure 8:
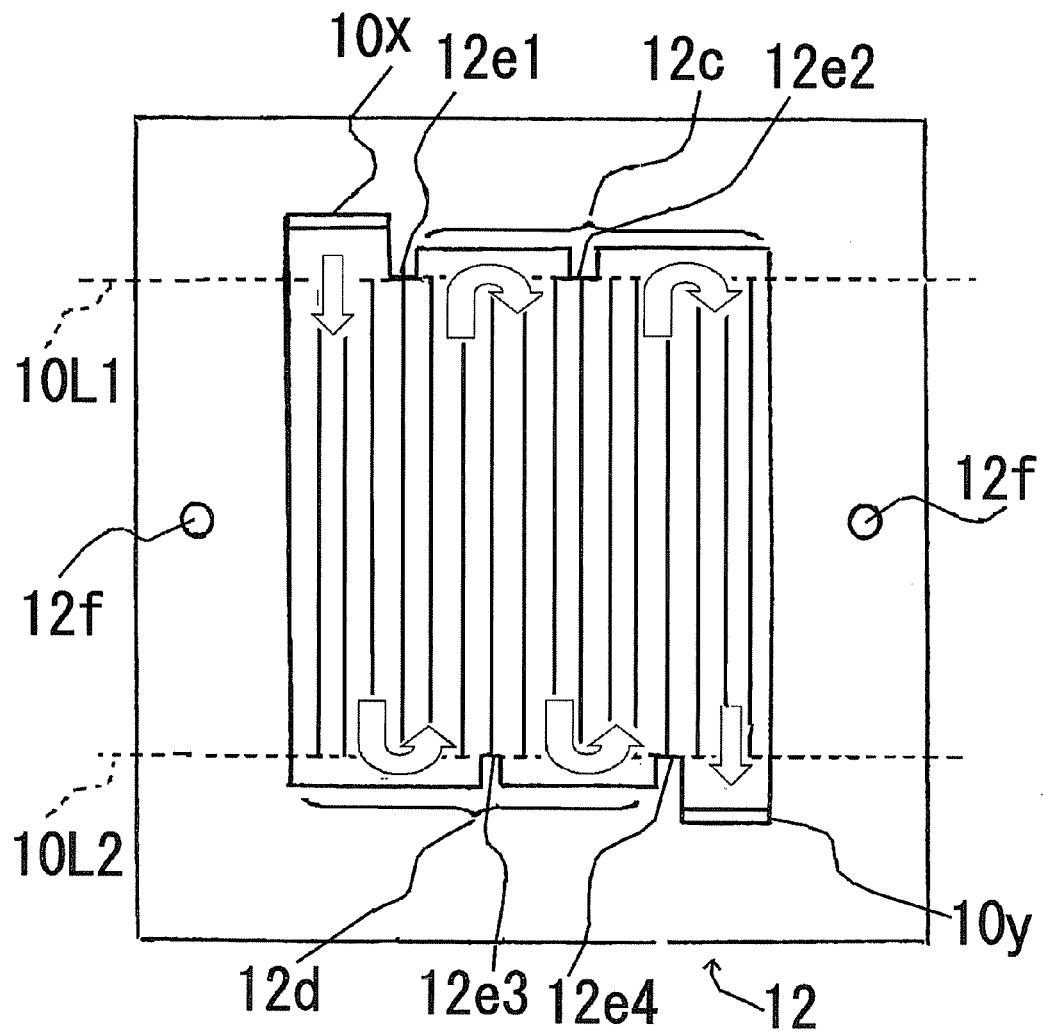
FIG. 8 is a plan view showing the structure of the gasket according to the embodiment of the present invention.

The dividing members 12e1 to 12e4 extending from the facing inner edges 12c and 12d of the gasket 12 are disposed in order from the left side in FIG. 8: the dividing members 12e1 (the upper inner edge 12c), 12e3 (the lower inner edge 12d), 12e2 (the upper inner edge 12c), and 12e4 (the lower inner edge 12d).

Thus, the dividing members extending from the facing inner edges of the gasket 12 are disposed in a staggered formation so that the gas flow paths flowing along the straight flow path channels 10L turn around near the dividing members to form a serpentine flow paths.

Specifically, the gas introduced from the fuel gas inlet hole 10x into the separator 10 flows down along the straight flow path channels 10L as shown in FIG. 8. The dividing member 12e3 is contacted with the lower ends of the flow path channels 10L, and inhibits the flows along the flow path channels 10L. In addition, the flow traversing the flow path channels 10L is originally inhibited. The flow path channels 10L abutted the dividing member 12e3 function as an embankment for inhibiting the gas flow both in horizontal (taking a short cut; right direction in FIG. 8) and longitudinal directions. So, the gas flow turns around and changes the direction by 180 degree near the dividing member 12e3, and flows upward along the straight flow path channels 10L. Then, the dividing members 12e1 and e2 inhibit the short cut flow in the horizontal direction as well. The gas flow turns around near the dividing member 12e2, and flows downward along the straight flow path channels 10L. In a similar fashion, the gas flow turns around near the dividing member 12e4, and flows along the straight flow path channels 10L. The right inner edge (side edge) of the gasket 12 inhibits the short cut flow of the gas flow, which turns around and is exhausted from the fuel gas outlet hole 10y along the straight flow path channels 10.

The number of the flow path channels abutted one dividing member depends on the size of the separator and the size (width) of the flow path channels, and therefore is not especially limited. If too many flow path channels are abutted, less flow path channels contributes to the gas flow. Preferably, 1 to 3 flow path channels are used.

As described above, the serpentine gas flow paths are provided in the gasket by means of the shape of the easily-workable gasket. As such, there is no need to form any complex flow paths in the separator, the shape of the flow paths in the separator can be simple, and the gas flow can be improved without compromising the productivity to enhance the fuel cell power generation properties. In other words, the parallel gas flow in the separator can be changed to the serpentine gas flow by means of the shape of the gasket.

In this regard, any shape of the flow path channels to be serpentine may be used, and the shape of the flow path channels is not limited.

The layered type (active type) fuel cell shown in FIG. 6 can be applied not only to the above-mentioned fuel cell using hydrogen as the fuel, but also for the DMFC using methanol as the fuel.

<Flat Type (Passive Type) Fuel Cell Separator>

Figure 9:
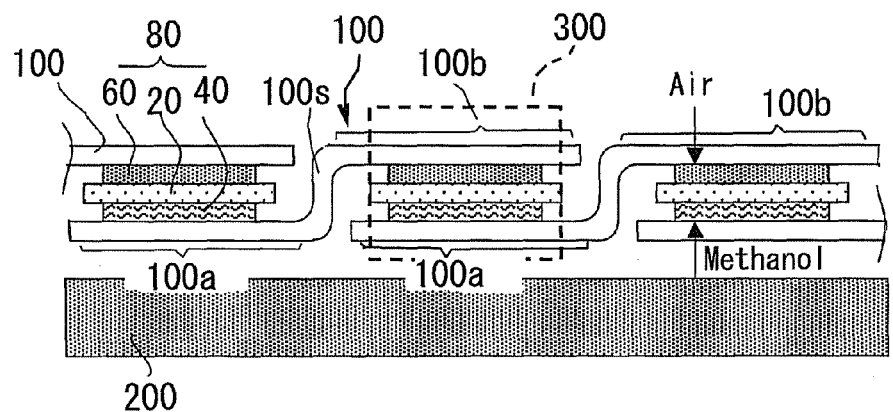
FIG. 9 is a section view of the flat type fuel cell stack according to the embodiment of the present invention.

FIG. 9 shows a section of a single cell of the flat type (passive type) fuel cell. In FIG. 6, current collector plates 140A and 140B are disposed outside of a separator 10, as described later. Generally, when the single cells are layered to form a stack, only a pair of the current collector plates is disposed on both ends of the stack.

In FIG. 9, the structure of the MEA 80 is the same as that in FIG. 6, so the same components are designated by the same symbols and the descriptions thereof are omitted. (In FIG. 9, the MEA 80 has no the gas diffusion layers 90A and 90B, but may have the gas diffusion layers 90A and 90B.)

In FIG. 9, the separator 100 has electrical conductivity, collects electricity upon contact with the MEA, and electrically connects each single cell. As described later, holes are formed on the separator 100 for flowing a fuel liquid and air (oxygen).

The separator 100 has a stair 100s on the center of an elongated tabular base so as to make the section crank shape, and includes an upper piece 100b disposed upper via the stair 100s and a lower piece 100a disposed below via the stair 100s. The stair 100s extends vertically in the longitudinal direction of the separator 100.

A plurality of the separators 100 are arranged in the longitudinal direction, spaces are provided between the lower pieces 100a and the upper pieces 100b of the abutted separators 100, and the MEAs 80 are, inserted into the spaces. The structure that the MEA 80 is sandwiched between two separators 100 constitutes a single cell 300. In this way, a stack that a plurality of the MEAs 80 are connected in series via the separators 100 is provided.

Figure 10:
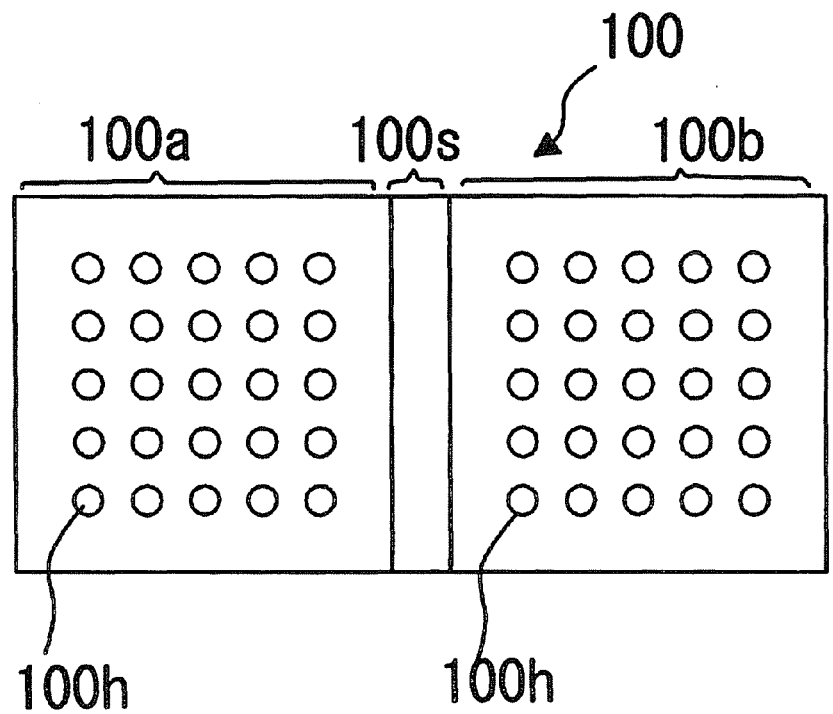
FIG. 10 is a plan view showing a structure of the flat type fuel cell separator.

FIG. 10 shows a top view of the separators 100. A plurality of holes 100h are formed on the lower pieces 100a and the upper pieces 100b, and become reaction gas flow paths for oxygen (air) and methanol reaction liquid flow paths.

In the stack, when air (oxygen) flows from above as shown in FIG. 9, oxygen passes through the holes 100h of the separators 100 and is contacted with the cathode electrodes 60 of the MEAs 80 for reaction. When methanol flows from below as shown in FIG. 9, methanol passes through the holes 100h of the separators 100 and is contacted with the anode electrodes 40 of the MEAs 80 for reaction. Methanol is provided from a lower tank (methanol cartridge) 200.

The flat type (passive type) fuel cell shown in FIG. 9 can be applied not only to the above-mentioned DMFC using methanol as the fuel, but also for the fuel cell using hydrogen as the fuel. The shape and the number of the openings of the flat type (passive type) fuel cell separator are not limited, the openings may be not only holes but also slits, or the whole separator may be net.

In the fuel cell separator of the present invention, reaction gas flow paths and/or reaction liquid flow paths are preferably press-formed on the Ti base in advance. In this way, there is no need to form the reaction gas flow paths (reaction liquid flow paths) in the later process, the Ti base is press-formed before the intermediate layer, the alloy layer and the like are formed, whereby the reaction flow paths (reaction liquid flow paths) are easily formed. Thus, the productivity is improved.

In the fuel cell separator of the present invention, on the fuel cell separator material comprising the alloy layer or the Au single layer on the surface of the Ti base, the reaction gas flow paths and/or the reaction liquid flow paths may be press-formed later. According to the fuel cell separator material of the present invention, since the alloy layer or the Au single layer strongly adheres to the surface of the Ti base, the reaction gas flow paths (reaction liquid flow paths) can be press-formed even after the layer formation without delaminating the layer. Thus, the productivity is improved.

In order to press-form the reactive gas flow paths (reaction liquid flow paths), it is preferable that the Ti base of the fuel cell separator material has a thickness of 10 μm or more. The upper limit of the thickness of the Ti base is not limited, but it is preferably 200 μm or less in terms of the costs.

<Fuel Cell Stack>

The fuel cell stack of the present invention is obtained by using the fuel cell separator material of the present invention or the fuel cell separator of the present invention.

The fuel cell stack has a plurality of cells connected in series where electrolyte is sandwiched between a pair of electrodes. The fuel cell separator is inserted between the cells to block the fuel gas or air. The electrode contacted with the fuel gas ($H_2$) is a fuel electrode (anode), and the electrode contacted with air ($O_2$) is an air electrode (cathode).

Non-limiting examples of the fuel cell stack have been described referring to FIGS. 6 and 9.

EXAMPLES

<Sample Preparation>

A commercially pure titanium sheet (JIS 1st class) having a thickness of 100 μm was used as the Ti base and was pre-treated with FIB (focused ion beam system). The Ti base was observed with energy-dispersive X-ray spectroscopy (EDX) of FE-TEM (field-emission transmission electron microscopy). It was identified that a titanium oxide layer having a thickness of about 6 nm was already formed on the surface of the Ti base.

In some examples, the Ti base (Ti coated base) was used by coating a Ti coating with a predetermined thickness as shown in Tables 1 and 2 on a commercially pure stainless steel sheet (SUS316L) having a thickness of 100 μm. Ti was coated with vacuum deposition using an electron beam vapor deposition system (manufactured by ULVAC-PHI, Inc., MB05-1006).

Then, a Cr or Mo layer (metal layer) was formed on the surface of the titanium oxide layer of the Ti base using a sputtering method to have the predetermined target thickness. A Cr or Mo target was used. Then, an Au layer was formed thereon using the sputtering method to have the predetermined target thickness. An Au target was used.

The target thickness was determined as follows. First, the object (e.g. Cr) was formed on the titanium base by sputtering. The actual thickness was measured by a fluorescent X-ray layer thickness meter (SEA5100 manufactured by Seiko Instruments, collimator 0.1 mm phi (diameter)), and the sputter rate (nm/min) under this sputtering condition was determined. Based on the sputter rate, the sputtering time for providing the thickness of 1 nm was calculated, and the sputtering was performed under this condition.

Cr, Mo and Au were sputtered using the sputtering apparatus manufactured by ULVAC-PHI, Inc., under the following conditions: output of DC50W, and argon pressure of 0.2 Pa.

<Measurement of Layer Structure>

The actual image of the section of the resultant sample obtained by the FE-TEM (field-emission transmission electron microscopy) was observed. The portion of the image to be EDX-analyzed is designated, and the portion was EDX-analyzed to determine the composition of each layer in the sample.

The FE-TEM apparatus used for observation was HF-2000 FE-TEM manufactured by Hitachi, Ltd. at accelerating voltage of 200 kV and ×100,000 and ×700,000 magnifications. The EDX apparatus used for analysis was Genesis series manufactured by EDAX International attached to the FE-TEM apparatus at 1 nm of the analysis area.

FIG. 3 shows the FE-TEM image of the section of the sample. It is observed that the alloy layer 6 comprising Cr and Au forms a uniform layer. In FIG. 3, the composition in the position C of the alloy layer 6 had Cr: 43% by mass and Au: 57% by mass, and the composition in the position D of the alloy layer 6 had Cr: 32% by mass and Au: 68% by mass by EDX. That means the concentration of Au was increased from the bottom layer to the upper layer. The composition in the position A was Ti, and the composition in the position B was the Ti oxide layer (or the intermediate layer) on the surface of the Ti base.

In addition, the section near the surface of the Ti base was analyzed by the STEM (scanning transmission electron microscope) to detect the concentrations of Ti, O and Cr. The STEM used for measurement was HD-2000 STEM manufactured by Hitachi, Ltd. at accelerating voltage of 200 kV, 900,000 magnification, and n number 3 fields.

In the concentration detection by the STEM, carbon was excluded from the detected elements. The concentration (% by mass) of each element was analyzed based on total 100% by mass of the designated elements. The abscissa axis in the chart of the STEM analysis shows the 1 nm distance in the thickness direction in the STEM analysis (FIG. 4).

Similarly, the section of the uppermost surface of the sample was analyzed by the STEM.

Figure 4:
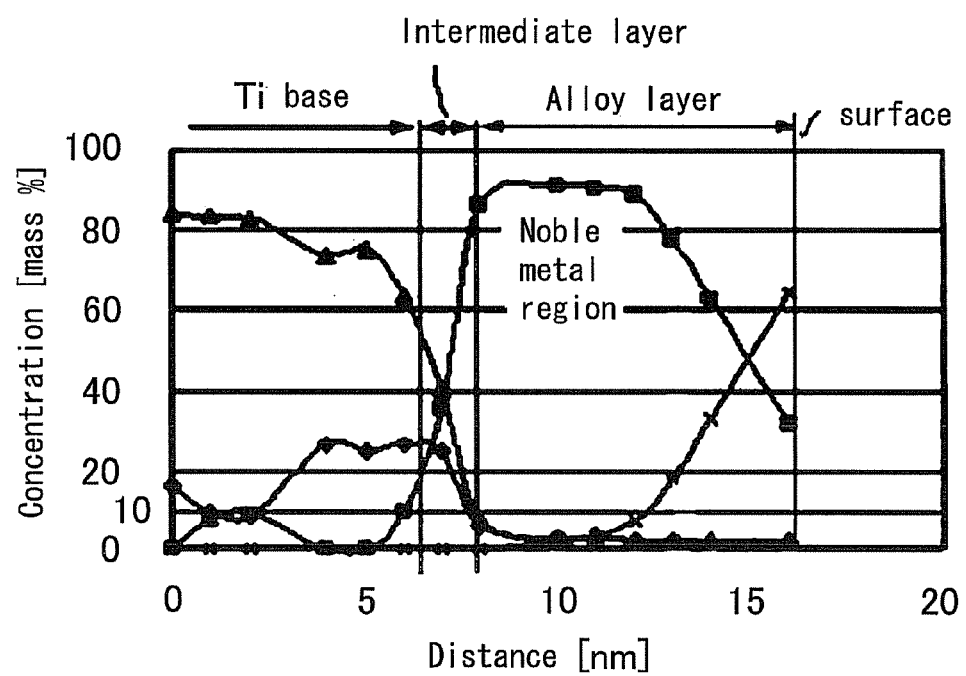
FIG. 4 shows a STEM analysis of a section of the fuel cell separator material according to the second embodiment of the present invention.

FIG. 4 shows the actual image of the section of the sample by the STEM.

It turns out that the intermediate layer 2a comprising 10% by mass or more of Ti, 10% by mass or more of O, 20% by mass or more of Cr and less than 20% by mass of Au with a thickness of 1 nm or more is provided on the surface of the Ti base 2.

According to the present invention, the concentrations of Ti, O and the like are specified to define the intermediate layer. Consequently, the boundary of the intermediate layer is determined by the concentrations of Ti and O as a matter of convenience, a layer different from the intermediate layer and Ti base may be interposed between the intermediate layer and the upper and lower layers (e.g. Ti base 2).

<Sample Preparation>

Samples for Examples 1 to 14 were produced by varying the target thickness of the Cr layer, the Mo layer and the Au layer upon sputtering on the titanium base (pure Ti, Ti coated material).

As Comparative Example 20, the Au layer having a thickness of 50 nm was formed on the surface of the Ti base using wet plating instead of sputtering. The wet plating was done in the order as follows: immersion degreasing, water washing, acid washing, water washing, activation treatment, water washing, gold plating, water washing and heat treatment.

As Comparative Examples 21 and 22, only the Au layer and Cr layer were formed, respectively, upon sputtering.

As Comparative Example 23, the Cr layer was formed upon sputtering such that the target thickness was decreased to 0.5 nm. As Comparative Example 24, the Au layer was formed upon sputtering such that the target thickness was decreased to 0.5 nm. As Comparative Example 25, the Cr layer and the Au layer were formed as in Example 13 except that the Ti base (Ti) was immersed into a pretreatment liquid containing a fluoride before sputtering, the oxide on the surface of the base was removed, and then the base was sputtered.

<Evaluation>

Each sample was evaluated as follows:

A. Adhesion Property

The uppermost alloy layer of each sample was scribed a grid pattern at 1 mm intervals. The adhesion tape was adhered thereto. Each sample piece was bent at 180 degree and was then returned to the original position. The tape on the bent portion was rapidly and strongly peeled off. Thus, the peeling test was performed.

When no peeling-off occurred, the evaluation was good. When any peeling-off was recognized by visual inspection, the evaluation was bad.

B. Surface Shape

The FE-TEM image of the section of each sample was obtained. When the irregular structure on which several nms to hundreds nms of particles were aggregated, the shape was granular. When the surface was smoother than the granular shape, the shape was laminar.

C. Contact Resistance

Contact resistance was measured by applying a load onto the entire surface of the sample. A carbon paper was laminated on one side of a 40×50 mm sheet sample. Cu/Ni/Au plates were laminated on another side of the sample and on the carbon paper. The Cu/Ni/Au plate was a material comprising a copper plate having a thickness of 10 mm, Ni base plating having a thickness of 10 μm on the copper plate, and Au plating having a thickness of 0.5 μm on the Ni layer. The surface of the Au plating of the Cu/Ni/Au plate was disposed to be contacted with the sample or the carbon paper.

On the outer surface of each Cu/Ni/Au plate, a TEFLON™ plate was disposed respectively. To the outside of each TEFLON™ plate, a load of 10 kg/cm$^2$ was applied by a load cell in a compression direction. Under the condition, a constant current having a current density of 100 mA/cm$^2$ was applied between two Cu/Ni/Au plates to measure electric resistance therebetween by four terminal method.

Contact resistance was measured before and after corrosion resistance test that the sample (40 mm×50 mm) was immersed into 350 cc of the solution under the following four conditions:

Condition 1: Sulfuric acid solution (bath temperature of 80° C., concentration of 0.5 g/L, immersion time of 240 hours)

Condition 2: Methanol solution (bath temperature of 80° C., concentration of 400 g/L, immersion time of 240 hours)

Condition 3: Formic acid solution A (bath temperature of 80° C., concentration of 1 g/L, immersion time of 240 hours)

Condition 4: Formic acid solution B (bath temperature of 80° C., concentration of 9 g/L, immersion time of 240 hours)

In the case of the DMFC, the conditions 2 to 4 are added to the condition 1 (the corrosion resistance condition of the normal polymer electrolyte fuel cell), and the numbers of the corrosion resistance test conditions to be evaluated are increased as compared with the normal polymer electrolyte fuel cell.

Typical properties needed for the fuel cell separators are low contact resistance (10 mΩ·cm$^2$ or less) and corrosion resistance under the usage environment (low contact resistance and no toxic ion elution after the corrosion resistance test (ion concentration tested <=0.1%)). The ion elution was analyzed by ICP.

D. Durability

Separators were produced using the above-described samples of Examples and Comparative Examples as the separator materials. These separators were incorporated into the predetermined fuel cell (PEFC). Sequential electric generation test for 1000 hours (current density: 0.5 A/cm$^2$, cell temperature: 80° C., hydrogen gas flow rate: 220 SCCM, hydrogen gas bubbler temperature: 80° C., air flow rate: 1080 SCCM, air bubbler temperature: 80° C.) was conducted to evaluate the durability of the samples. When the sample (separator) had any discoloration or deformation in appearance before and after the durability test (sequential electric generation test), such sample (separator) was evaluated as poor durability, i.e., "discoloration" or "deformation". When the separator had no change in appearance before and after the durability test, such separator was evaluated as excellent durability, i.e., "no change". As to the analysis of the broken sample (separator), a titanium hydride deposit can always be detected.

Among the samples having bad adhesion properties of Examples and Comparative Examples, the samples with better adhesion properties were cut to produce the separators for durability evaluation.

Tables 1 to 4 show the results. The thickness of each of the intermediate layer, the uppermost layer and the metal layer was an average value of three points by the STEM analysis.

TABLE 1

| | No. | Type of Ti base | Layer forming | Layer forming method | Heat treatment after layer formation (160 degree C. × 24.6 h) | Adhesion property | Surface shape | Intermediate layer (Average) [nm] | Thickness of 50 wt % or more of Au from the uppermost to the lower layer [nm] | Thickness of 20 wt % or more of Au from the uppermost to the lower layer [nm] | Metal layer thickness [nm] |
|---|---|---|---|---|---|---|---|---|---|---|---|
| Example | 1 | Ti | Sputtering | 1 nm thickness Cr layer was formed, and then 1 nm thickness Au layer was formed. | No | Good | Layer | 1 | 1 | — | 0 |
| | 2 | Ti | Sputtering | 1 nm thickness Cr layer was formed, and then 10 nm thickness Au layer was formed. | No | Good | Layer | 1 | 11 | — | 0 |
| | 3 | Ti | Sputtering | 1 nm thickness Cr layer was formed, and then 100 nm thickness Au layer was formed. | No | Good | Layer | 1 | 102 | — | 0 |
| | 4 | Ti | Sputtering | 5 nm thickness Cr layer was formed, and then 1 nm thickness Au layer was formed. | No | Good | Layer | 2.5 | 1 | — | 3 |
| | 5 | Ti | Sputtering | 5 nm thickness Cr layer was formed, and then 10 nm thickness Au layer was formed. | No | Good | Layer | 2.5 | 11 | — | 3 |
| | 6 | Ti | Sputtering | 5 nm thickness Cr layer was formed, and then 100 nm thickness Au layer was formed. | No | Good | Layer | 2.5 | 102 | — | 3 |
| | 7 | Ti | Sputtering | 7 nm thickness Cr layer was formed, and then 10 nm thickness Au layer was formed. | No | Good | Layer | 3.5 | 11 | — | 5 |
| | 8 | Ti | Sputtering | 10 nm thickness Cr layer was formed, and then 10 nm thickness Au layer was formed. | No | Good | Layer | 4.0 | 11 | — | 7 |
| | 9 | Ti | Sputtering | 15 nm thickness Ag layer was formed, and then 10 nm thickness Au layer was formed. | No | Good | Layer | 4.5 | 11 | — | 10 |
| | 10 | Ti coated (10 nm) | Sputtering | 5 nm thickness Cr layer was formed, and then 10 nm thickness Au layer was formed. | No | Good | Layer | 2.5 | 11 | — | 3 |
| | 11 | Ti | Sputtering | 1 nm thickness Mo layer was formed, and then 10 nm thickness Au layer was formed. | No | Good | Layer | 1 | 11 | — | 0 |
| | 12 | Ti | Sputtering | 2 nm thickness Cr layer was formed, and then 2 nm thickness Au layer was formed. | No | Good | Layer | 1.5 | 1.5 | — | 0 |
| | 13 | Ti | Sputtering | 2 nm thickness Cr layer was formed, and then 5 nm thickness Au layer was formed. | No | Good | Layer | 1.7 | 4.0 | — | 0 |
| | 14 | Ti | Sputtering | 2 nm thickness Cr layer was formed, and then 2 nm thickness Au layer was formed. | Done | Good | Layer | 10.0 | 0 | 23.0 | 0 |

TABLE 2

| | No. | Type of Ti base | Layer forming | Layer forming method | Heat treatment after layer formation (160 degree C. × 24.6 h) | Adhesion property | Surface shape | Intermediate layer (Average) [nm] | Thickness of 50 wt % or more of Au from the uppermost to the lower layer [nm] | Thickness of 20 wt % or more of Au from the uppermost to the lower layer [nm] | Metal layer thickness [nm] |
|---|---|---|---|---|---|---|---|---|---|---|---|
| Comparative Example | 20 | Ti | Wet plating | 50 nm thickness Au plating | No | Good | Granular | 0 | 53 | — | 0 |
| | 21 | Ti | Sputtering | Only 10 nm thickness Au layer | No | Bad | Layer | 0 | 11 | — | 0 |

TABLE 2-continued

| | No. | Type of Ti base | Layer forming | Layer forming method | Heat treatment after layer formation (160 degree C. × 24.6 h) | Adhesion property | Surface shape | Intermediate layer (Average) [nm] | Thickness of 50 wt % or more of Au from the uppermost to the lower layer [nm] | Thickness of 20 wt % or more of Au from the uppermost to the lower layer [nm] | Metal layer thickness [nm] |
|---|---|---|---|---|---|---|---|---|---|---|---|
| ple | 22 | Ti | Sputtering | Only 10 nm thickness Cr layer | No | Good | Layer | 4 | 0 | — | 8 |
| | 23 | Ti | Sputtering | 0.5 nm thickness Cr layer was formed, and then 10 nm thickness Au layer was formed. | No | Bad | Layer | less than 1 | 11 | — | 0 |
| | 24 | Ti | Sputtering | 1 nm thickness Cr layer was formed, and then 0.5 nm thickness Au layer was formed. | No | Good | Layer | 1 | less than 1 | — | 0 |
| | 25 | Ti (oxide film removal) | Sputtering | 2 nm thickness Cr layer was formed, and then 5 nm thickness Au layer was formed. | No | Good | Layer | less than 1 | 4.0 | — | 0 |

TABLE 3

| | No. | Contact resistance [m ohm cm2] | | | | | | | | Corrosion resistance Appearance change before and after the durability test |
|---|---|---|---|---|---|---|---|---|---|---|
| | | Sulfuric acid solution | | Methanol solution | | Formic acid solution A | | Formic acid solution B | | |
| | | Before the corrosion resistance test | After the corrosion resistance test | Before the corrosion resistance test | After the corrosion resistance test | Before the corrosion resistance test | After the corrosion resistance test | Before the corrosion resistance test | After the corrosion resistance test | |
| Example | 1 | 10 | 10 | 10 | 10 | 10 | 10 | 10 | 10 | No change |
| | 2 | 10 | 10 | 10 | 10 | 10 | 10 | 10 | 10 | No change |
| | 3 | 10 | 10 | 10 | 10 | 10 | 10 | 10 | 10 | No change |
| | 4 | 10 | 10 | 10 | 10 | 10 | 10 | 10 | 10 | No change |
| | 5 | 10 | 10 | 10 | 10 | 10 | 10 | 10 | 10 | No change |
| | 6 | 10 | 10 | 10 | 10 | 10 | 10 | 10 | 10 | No change |
| | 7 | 10 | 10 | 10 | 10 | 10 | 10 | 10 | 10 | No change |
| | 8 | 10 | 10 | 10 | 10 | 10 | 10 | 10 | 10 | No change |
| | 9 | 10 | 10 | 10 | 10 | 10 | 10 | 10 | 10 | No change |
| | 10 | 10 | 10 | 10 | 10 | 10 | 10 | 10 | 10 | No change |
| | 11 | 10 | 10 | 10 | 10 | 10 | 10 | 10 | 10 | No change |
| | 12 | 10 | 10 | 10 | 10 | 10 | 10 | 10 | 10 | No change |
| | 13 | 10 | 10 | 10 | 10 | 10 | 10 | 10 | 10 | No change |
| | 14 | 10 | 10 | 10 | 10 | 10 | 10 | 10 | 10 | No change |
| Comp Ex | 20 | 10 | 10 | 10 | 10 | 10 | 10 | 10 | 10 | No change |
| | 21 | — | — | — | — | — | — | — | — | — |
| | 22 | 10 | 40 | 10 | 13 | 10 | 20 | 10 | 30 | Discoloration |
| | 23 | — | — | — | — | — | — | — | — | Discoloration |
| | 24 | 10 | 42 | 10 | 18 | 10 | 28 | 10 | 47 | Discoloration |
| | 25 | 10 | 16 | 10 | 12 | 10 | 11 | 10 | 15 | No change |
| Target value | | 10 | 10 | 10 | 10 | 10 | 10 | 10 | 10 | No change |

TABLE 4

| | No. | Metal elution amount after the corrosion resistance test [mg/L] | |
|---|---|---|---|
| | | Sulfuric acid solution | Formic acid solution B |
| Example | 1 | <0.01 | <0.01 |
| | 2 | <0.01 | <0.01 |
| | 3 | <0.01 | <0.01 |
| | 4 | <0.01 | <0.01 |
| | 5 | <0.01 | <0.01 |
| | 6 | <0.01 | <0.01 |
| | 7 | 0.01 | <0.01 |
| | 8 | 0.03 | 0.03 |
| | 9 | 0.04 | 0.04 |
| | 10 | <0.01 | <0.01 |
| | 11 | <0.01 | <0.01 |
| | 12 | <0.01 | <0.01 |

TABLE 4-continued

|  | No. | Metal elution amount after the corrosion resistance test [mg/L] | |
|---|---|---|---|
|  |  | Sulfuric acid solution | Formic acid solution B |
|  | 13 | <0.01 | <0.01 |
|  | 14 | <0.01 | <0.01 |
| Comparative Example | 20 | — | — |
|  | 21 | — | — |
|  | 22 | 0.42 | 0.38 |
|  | 23 | <0.01 | <0.01 |
|  | 24 | <0.01 | <0.01 |
|  | 25 | 0.03 | <0.01 |
| Target |  | <=0.1 | <=0.1 |

As shown in Tables 1 to 4, in Examples 1 to 14 having the intermediate layer containing 10% by mass or more of Ti, 10% by mass or more of O, 20% by mass or more of the first component such as Cr, and less than 20 mass % of Au with a thickness of 1 nm or more disposed between the alloy layer and the Ti base, all layers had excellent adhesion, and the alloy layer or the Au layer (uppermost layer) formed by sputtering had smooth laminar. Also in these Examples, the contact resistance did not change before and after the corrosion resistance test, the appearance was not changed before and after the durability test, and the corrosion resistance, the electrical conductivity and the durability were excellent. In Example 10 where the Ti coated material having a thickness of 10 nm or more was used in place of the pure Ti base, the same level of the corrosion resistance and the electrical conductivity as other Examples were provided.

In each of Examples 1 to 13, the region containing 50% by mass or more of Au from the uppermost surface toward the lower layer had a thickness of 1 nm or more. In Example 14, the region containing 50% by mass or more of Au from the uppermost surface toward the lower layer had a thickness of 0, but the region containing 10% by mass or more to less than 50% by mass of Au from the uppermost surface toward the lower layer had a thickness of 3 nm or more, which had the same level of the corrosion resistance and the electrical conductivity as other Examples.

In Examples 8 and 9, the metal layer had a thickness of exceeding 5 nm, the metal elution amount after the corrosion resistance test was slightly higher than those in other Examples, but there is no problem in practical use.

In Comparative Example 20 where the Au layer was formed by wet plating, the uppermost layer became granular, and the amount used of Au was increased.

In Comparative Example 21 where only Au was sputtered, no intermediate layer was formed and the adhesion property became poor. On the other hand, in Comparative Example 22 where only Cr was sputtered and the uppermost layer did not contain Au, the contact resistance was significantly increased after the corrosion resistance test. It is considered that the corrosion resistance was decreased because the uppermost layer did not contain Au.

In Comparative Example 23 where the target thickness of the Cr layer was decreased to 0.5 nm and sputtered, the intermediate layer had a thickness of less than 1 nm, the adhesion property became poor, and the separator was deformed by hydrogen embrittlement after the durability test.

In Comparative Example 24 where the target thickness of the Au layer was decreased to 0.5 nm and the region containing 50% by mass or more of Au from the uppermost surface toward the lower layer had a thickness of less than 1 nm or more, the contact resistance was significantly increased after the corrosion resistance test.

In Comparative Example 25 where the oxide on the surface of the Ti base (pure Ti) was removed and sputtered, the coated layer had good adhesion property even though the intermediate layer had a thickness of less than 1 nm, but the corrosion resistance was slightly poor because the oxide layer on the surface of the base was thin, the contact resistance was increased after the corrosion resistance test, and the metal elution amount was slightly high.

What is claimed is:

1. A fuel cell separator material, comprising an alloy layer containing Au and a first component containing at least one metal selected from a group consisting of Cr and Mo formed on a Ti base; and an intermediate layer containing Ti, O, the first component, and less than 20 mass % of Au arranged between the alloy layer and the Ti base; wherein the intermediate layer exists as a layer having a thickness of 1 nm or more containing 10 mass % or more of Ti and O, respectively, and 20 mass % or more of the first component, wherein the concentration of the first component of the intermediate layer is decreased toward the Ti base in the thickness direction and the concentration of Ti of the intermediate layer is increased toward the Ti base in the thickness direction; wherein the alloy layer has a region having a thickness of 1 nm or more from the uppermost surface toward the lower layer and containing 50 mass % or more of Au, or a region having a thickness of 3 nm or more from the uppermost surface toward the lower layer and containing Au in the range from 10 mass % or more to less than 50 mass %; and wherein a metal layer comprising the first component and having a thickness of 3 nm or less is formed between the alloy layer and the intermediate layer.

2. The fuel cell separator material according to claim 1, wherein the concentration of the Au in the alloy layer is increased from the bottom to the upper part of the layer.

3. The fuel cell separator material according to claim 1, wherein an Au single layer is formed on the surface of the alloy layer.

4. The fuel cell separator material according to claim 1, wherein the Ti base is formed by coating a Ti coating with a thickness of 10 nm or more on a material other than Ti.

5. A fuel cell separator material according to claim 1, for use in a polymer electrolyte fuel cell.

6. The fuel cell separator material according to claim 5, for use in a direct methanol polymer electrolyte fuel cell.

7. A fuel cell separator comprising the fuel cell separator material according to claim 1, wherein a reaction gas flow path and/or a reaction liquid flow path is press-formed on the Ti base, and then the alloy layer is formed.

8. A fuel cell separator comprising the fuel cell separator according to claim 1, wherein the alloy layer is formed on the Ti base, and then a reaction gas flow path and/or a reaction liquid flow path is press-formed.

9. A fuel cell stack, comprising the fuel cell separator material according to claim 1.

10. A fuel cell stack, comprising the fuel cell separator according to claim 7.

11. A fuel cell stack, comprising the fuel cell separator according to claim 8.

* * * * *